(12) United States Patent
Patzelt

(10) Patent No.: US 9,098,602 B2
(45) Date of Patent: Aug. 4, 2015

(54) STORAGE OF A DESIRED ADDRESS IN A DEVICE OF A CONTROL SYSTEM

(71) Applicant: WAGO Verwaltungsgesellschaft mbH, Minden (DE)

(72) Inventor: Andreas Patzelt, Bunde (DE)

(73) Assignee: WAGO VERWALTUNGSGESELLSCHAFT MBH, Minden (DE)

( * ) Notice: Subject to any disclaimer, the term of this patent is extended or adjusted under 35 U.S.C. 154(b) by 155 days.

(21) Appl. No.: 13/943,892

(22) Filed: Jul. 17, 2013

(65) Prior Publication Data

US 2014/0025883 A1   Jan. 23, 2014

(30) Foreign Application Priority Data

Jul. 18, 2012  (DE) .......................... 10 2012 106 449

(51) Int. Cl.
| | |
|---|---|
| *G06F 12/00* | (2006.01) |
| *G06F 17/30* | (2006.01) |
| *G06F 11/10* | (2006.01) |
| *G06F 12/14* | (2006.01) |
| *G06F 12/02* | (2006.01) |
| *G06F 11/08* | (2006.01) |
| *H04L 29/12* | (2006.01) |

(52) U.S. Cl.
CPC .......... *G06F 17/30982* (2013.01); *G06F 11/08* (2013.01); *G06F 11/1004* (2013.01); *G06F 12/02* (2013.01); *G06F 12/14* (2013.01); *H04L 61/2038* (2013.01)

(58) Field of Classification Search
CPC ......... G06F 12/02; G06F 12/14; G06F 11/08; G06F 11/1004
See application file for complete search history.

(56) References Cited

U.S. PATENT DOCUMENTS

| | | | |
|---|---|---|---|
| 7,831,742 B2 | 11/2010 | Bernardi |
| 8,260,884 B2 | 9/2012 | Schmidt |

FOREIGN PATENT DOCUMENTS

| | | |
|---|---|---|
| DE | 10 2008 001 886 | 11/2009 |
| EP | 1 686 767 | 11/2007 |
| EP | 2 015 536 | 1/2009 |

*Primary Examiner* — Shawn X Gu

(74) *Attorney, Agent, or Firm* — Renner, Otto, Boisselle & Sklar, LLP.

(57) ABSTRACT

A method, apparatus, program and system is provided for storing a desired address in a device of a control system in which at least one device of a first type and one or more devices of a second type are connected to one another via a communication medium for the purpose of interchanging data. An index value and a unique address of a device of the second type are associated to one another and stored in the device of the first type. The association can be automatically retrieved when a device of the second type is replaced with a replacement device, and the new address of the replacement device can be automatically determined based on the association.

12 Claims, 3 Drawing Sheets

STORAGE OF A DESIRED ADDRESS IN A DEVICE OF A CONTROL SYSTEM

The invention relates to a method for storing a desired address in a device of a control system according to Claim 1. The invention also relates to such a control system according to Claim 9 as well as to a device of a first type of such a control system, a device of a second type of such a control system and a computer program.

The invention generally relates to the field of the storage of device addresses in a control system which has a plurality of devices and in which at least one device of a first type and one or more devices of a second type are connected to one another via a communication medium for the purpose of interchanging data. The communication medium used is often a bus system, in particular in the case of wired data interchange. However, the communication medium may also comprise a wireless link, for example a radio link. So that data can be interchanged in a targeted manner between devices in such a control system, these devices are addressed using a unique device address which allows unique association between the data to be interchanged and the desired device. In large control systems, for example in factory automation or in buildings, a large number of devices are often connected to one another via the communication medium. If one of the devices fails and is replaced with a replacement device, it should be ensured that the replacement device is equivalent to the original device, which generally requires the replacement device to have the same device address as the original device. In large control systems, the practice of adapting the system configuration to a new device address using a configuration tool would be associated with effort.

Methods for associating and storing device addresses are known, for example, from DE 20 2006 017 615 U1 or EP 1 686 767 B1. The invention is based on the object of specifying a method for storing a device address, which method can be carried out as easily as possible by the user and, in particular, also enables a device of a control system to be easily replaced. The intention is also to specify a corresponding control system as well as corresponding devices for the latter and a computer program.

The object is achieved according to Claim 1 by a method for storing a desired address in a device of a control system in which at least one device of a first type and one or more devices of a second type are connected to one another via a communication medium for the purpose of interchanging data,
a) the device of the first type determining a desired verification code, which is valid for a device of a second type, at least using a desired address and a desired index value of the device of the second type which are stored in a device association memory of the device of the first type,
b) the device of the first type transmitting the desired verification code to the device of the second type,
c) the device of the second type determining an actual verification code at least using an actual address stored in an intrinsic address memory of the device of the second type and an actual index value which is set in the device of the second type by means of an index value generating means present in said device,
d) the device of the second type comparing the actual verification code with the received desired verification code,
e) the device of the second type storing a desired address associated with the desired verification code as the new actual address in its intrinsic address memory if the actual verification code and the desired verification code differ.

The invention has the advantage that individual devices of the control system can be replaced in a simple manner. In particular, the relatively large amount of programming or configuration effort which is otherwise required is avoided. The replacement of a device also does not require any particular specific qualification of the fitter. Associating an index value and a unique address of a device of a second type and storing said association means that the address of the second device can be reset only by setting the index value in the replacement device. In this case, the index value may be set, for example, from the outside on the housing of the device of the second type, for example using pushbuttons or switches, if necessary with an operating tool such as a screwdriver. It is advantageous that the range of values of the index value may be considerably smaller than that of the complete unique device address, with the result that the device of the second type may be provided with a compact index value generating means of small construction. This has the advantage that the index value generating means can be easily accommodated in the device of the second type, for example on the front panel or the rear side. The index value generating means may be in the form of a DIP switch, a rotary switch, a display with a keyboard or similar operating means, for example. After the correct index value of the replacement device has been set, the device must only be installed in the control system. The next time the control system is started, the new actual address of the replacement device can then be automatically determined by the devices of the first and second types and can be stored in the intrinsic address memory of the replacement device.

The replacement device therefore has the same unique address as the device of the second type to be replaced. Like the actual verification code, the desired verification code may be in the form of an error-detecting or error-correcting code or may have such a code. For example, the desired verification code may be in the form of a verification digit or may have such a verification digit, for example a verification digit formed according to the principle of the cyclic redundancy check (CRC). The operational safety of the control system can be considerably increased by means of verification codes formed in this manner, with the result that the control system can also be used in safety-critical applications.

The method is suitable both for segmented and for non-segmented control systems. In this case, the term "segmentation" is used to denote structuring of the communication medium into superordinate and subordinate partial segments which are also referred to as network segments. The network segments may be connected to one another by means of individual specific modules, for example by means of bus couplers or gateways. According to one advantageous development of the invention, the desired address is a unique address of the entire control system. In the case of segmentation, the desired address is therefore also unique over all partial segments of the communication medium.

The new actual address associated with a device of a second type using the method according to the invention can be used, in particular, by other devices of the control system, which are connected only indirectly to that part of the communication medium to which the device of the second type is connected, to address the device of the second type. For example, a safety PLC connected to a different bus segment can address the devices of the second type in the bus segment thereof via one or more bus coupler modules or gateways using the actual address associated according to the invention.

In order to determine the desired verification code, either only the desired address and the desired index or further specific information relating to the device of the second type, for example a corresponding type identification or a series identifier, can be used. In this case, it is advantageous to likewise store these additional data in the device association memory. The actual verification code can be determined in a corresponding manner in the device of the second type. It is advantageous to make the specific information relating to the device of the second type, which is to be taken into account for this purpose, available in a memory of the device of the second type.

According to one advantageous development of the invention, the index value is not unique with respect to the entire control system but is unique with respect to a communication segment which is managed by the device of the first type. This allows safe communication between the devices of the first and second types within the communication segment on the basis of the index value, even without the actual address already corresponding to the correct desired address.

According to one advantageous development of the invention, the desired address comprises a wider range of values than the index value. A corresponding situation applies to the actual address and the actual index value.

Step e) in Claim 1 can be carried out in different ways. In a first advantageous development, the device of the first type already transmits the desired address together with the desired verification code, with the result that this desired address is already available to the device of the second type when said address is intended to be stored as the new actual address. For example, the desired verification code can be transmitted in a common data message with the desired address, or the desired address can be directly coded in the desired verification code and can then be decoded again in the device of the second type. The desired address can also be sent from the device of the first type to the device of the second type using a separate message without a special request.

If the actual verification code and the desired verification code differ, one advantageous development of the invention provides for the device of the second type to inform the device of the first type of the difference. This has the advantage that, as a result of the information relating to the difference, the device of the first type receives feedback relating to the result of the comparison in the device of the second type in a defined manner and can then transmit the desired address associated with the desired index value of the device of the second type in the device association memory of the device of the first type to the device of the second type in a targeted manner. One advantageous development may provide for the desired address to be transmitted in this case to the device of the second type together with the desired index value. This has the advantage that the device of the second type can carry out a subsequent comparison in order to determine whether the received desired index value matches the actual index value of the device of the second type and stores the desired address transmitted by the device of the first type as the new actual address in its intrinsic address memory only in the case of a match. If the desired index value and the actual index value do not match in this case, this indicates an error and the device of the second type can change to a safe state, for example, or can remain in said state. The safe state may be characterized, for example, by the fact that the device of the second type does not carry out a control function and is inactive.

According to one advantageous development of the invention, the device of the first type transmits the desired verification code to the device of the second type in an address allocation operating mode and in the process associates the device of the second type using the index value. An address allocation operating mode is therefore advantageously provided in the device of the first type, which mode may first of all be activated each time the control system is started, for example, and changes to a normal operating mode after a certain starting phase. The device of the second type can be addressed by the device of the first type in the address allocation operating mode, the normal operating mode or in both operating modes via a local address mechanism of that segment of the communication medium via which the device of the second type is connected to the device of the first type, for example via a local bus segment. The local address mechanism may be different from the global address mechanism, in particular. As mentioned, the global address mechanism uses the actual addresses stored in the intrinsic address memories of the devices, that is to say the complete address information, to address the devices. Addressing a device of the second type using its connection position number on the local bus segment (slot number) may be mentioned as an example of such a local address mechanism. Whereas a device of the second type is physically addressed in this case via the local address mechanism, the index value set in the device of the second type is additionally used by the device of the first type to associate the data transmitted to the device of the second type.

The invention is also suitable for embodiments of control systems in which a local address mechanism is not available or is not functional. In this case, the device of the first type can address a device of the second type in a targeted manner by using the index value set there. This makes it possible to implement an alternative local address mechanism at least during the address allocation operating mode using the index value.

In the normal operating mode, provision may also be made for the device of the second type to then be addressed by the device of the first type using the desired address stored in the device of the first type.

Accordingly, one advantageous development of the invention may provide for the device of the second type to have at least two addressing modes, namely an index value addressing mode in which the device of the second type can be addressed via the communication medium using the index value, and a normal addressing mode in which the device of the second type can be addressed via the communication medium using the actual address stored in the intrinsic address memory. In principle, the index value addressing mode and the normal addressing mode can be activated alongside one another, that is to say in a parallel manner. In one advantageous development, the device of the second type is designed in such a manner that the index value addressing mode is activated only during the duration of the address allocation operating mode and the device of the second type then independently changes to the normal addressing mode as the only addressing mode.

If the device of the second type is addressed by the device of the first type in an index value addressing mode using the index value, the desired address can be stored as the new actual address in the intrinsic address memory of the device of the second type in step e) without further verification of the index value since it is clear that the appropriate device of the second type has been addressed. If a broadcast transmission mode is provided, in which the device of the first type generally transmits messages containing the desired verification code of a particular device of the second type to a plurality of or all connected devices of the second type, it is advantageous if, before storing the desired address in the intrinsic address memory of the device of the second type, a check is carried out there in step e) in order to determine whether the desired index value matches the actual index value. For this purpose, the desired index value should be transmitted from the device of the first type to the device of the second type, which can be effected, for example, by means of corresponding coding in the desired verification code or by concomitantly transmitting the desired index value with the desired verification code or by means of a special request for the desired verification code from the device of the second type, for example when a difference between the actual verification code and the desired verification code has been determined in the device of the second type.

A check is then carried out in the device of the second type in order to determine whether the desired index value matches the actual index value before the desired address is stored as the new actual address in the intrinsic address memory. If there is a match, storage is effected. Otherwise, the device of the second type can change to a safe state, for example, and can signal an error.

The object mentioned at the outset is also achieved according to Claim 9 by a control system having the following features:

a) at least one device of a first type and one or more devices of a second type, the devices of the first and second types being connected to one another via a communication medium for the purpose of interchanging data,
b) the device of the first type has a device association memory which stores at least the desired addresses of one or more devices of the second type and their associated desired index values,
c) the device of the first type is set up to carry out the steps of the method according to one of Claims 1 to 8 to be carried out by the device of the first type,
d) the device of the second type has an index value generating means, which can be used to set an index value of the device of the second type in this device, and an intrinsic address memory for storing its own actual address,
e) the device of the second type is set up to carry out the steps of the method according to one of Claims 1 to 8 to be carried out by the device of the second type.

The control system therefore has the above-mentioned advantages.

The object is also achieved by a device of a first type of a control system of the type mentioned above.

The device of the first type may be in the form of a non-failsafe device or a failsafe device, in particular a device of an industrial automation system. A non-failsafe device is preferable for cost-effective implementation. If a failsafe device is present anyway, this may additionally undertake the functions of the device of the first type. According to one advantageous development of the invention, the device of the first type is in the form of a bus coupler module of a safe control system or in the form of another storage module. The device of the first type may, in principle, be formed by an external device of a wide variety of designs, in which case devices which have different main functions per se and undertake the function of the previously described device of the first type for address allocation as an additional function are also possible. For example, the device of the first type may be a configuration tool for configuring the control system, a storage module of the control system which is connected to the communication medium or a different device of the second type in which the functions of the device of the first type are additionally implemented.

The object mentioned at the outset is also achieved by a device of a second type of a control system of the type described above.

According to one advantageous development of the invention, the device of the second type is in the form of a failsafe device of a safe control system, in particular a failsafe device of an industrial automation system.

The object mentioned at the outset is also achieved by a computer program with program code means, set up to carry out the steps of the method of the type described above to be carried out by the device of the first type or by the device of the second type if the computer program is executed on a computer of the respective device of the first or second type. The computer program may be stored, in particular, on a machine-readable storage means, for example in a semiconductor memory, for example a ROM or flash ROM, or on a memory stick, a CD or DVD or another portable data storage medium.

The invention is explained in more detail below with reference to exemplary embodiments and using drawings, in which.

In the figures, identical reference symbols are used for mutually corresponding elements.

Figure 1:
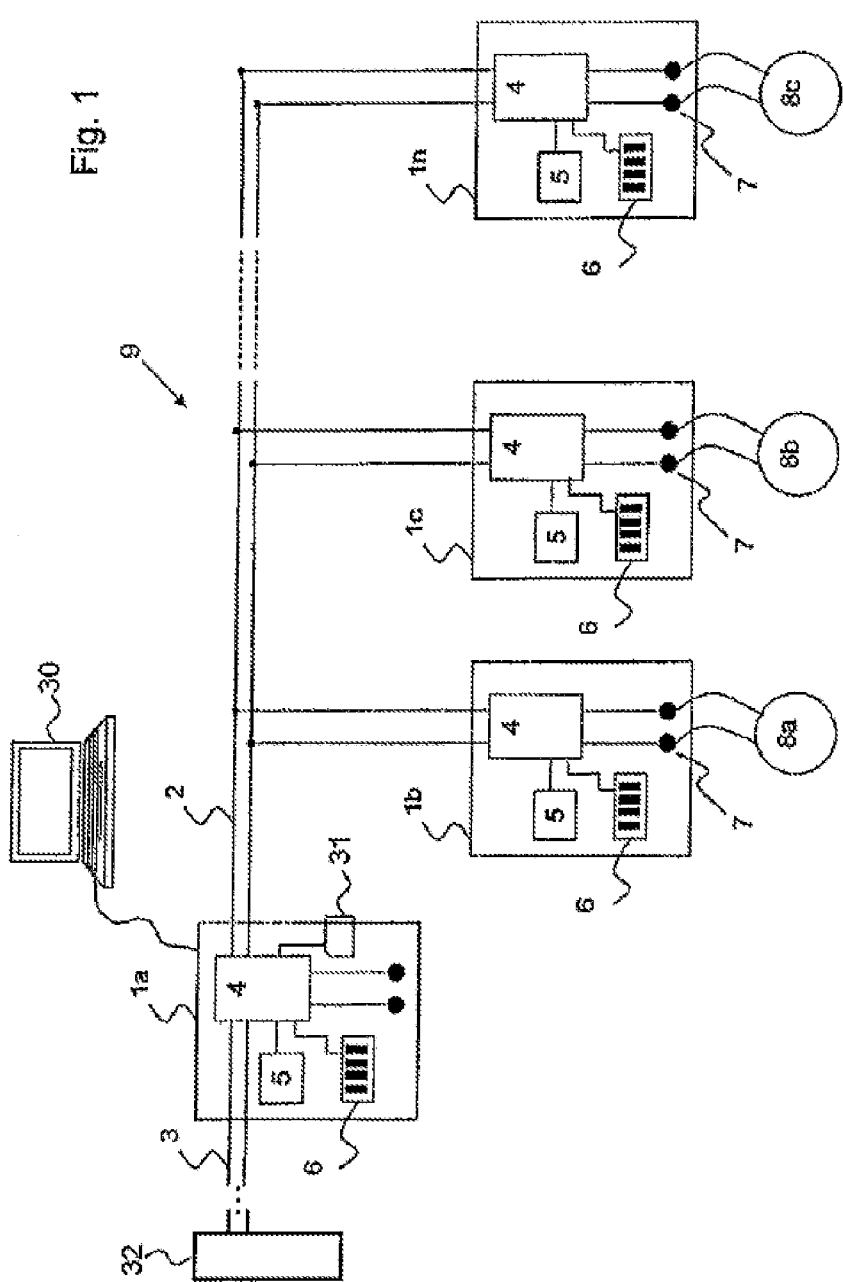
FIG. 1 shows a block diagram of part of a control system.

FIG. 1 schematically shows a control system 9 or part of a control system. It is possible to see a multiplicity of devices 1a, 1b, 1c, . . . , 1n which are connected to one another via a communication medium 2, for example a data bus. The devices 1a, 1b, 1c, . . . , 1n are also referred to as bus subscribers. The communication medium 2 enables communication according to the PROFIsafe protocol, the PROFInet protocol, the Ethernet IP protocol, the Sercos protocol, the DeviceNet protocol or the CIP Safety protocol, for example. In this case, the bus subscribers 1a, 1b, 1c, . . . , 1n are addressed using a unique identifier which is usually referred to as the device address. The device address is defined differently, depending on the protocol used.

In the PROFIsafe protocol, slave bus subscribers, such as the bus subscribers 1b, 1c, . . . , 1n in the present example, are addressed using a PROFIsafe slave address. The safe protocol PROFIsafe uses an F-Source/Destination Address for unique addressing. This address consists of two 16-bit values, at least the F-Destination Address part of which must be present in the slave bus subscriber for the check when setting up the connection.

In the PROFInet protocol, the bus subscribers 1a, 1b, 1c, . . . , 1n are addressed using a device name associated with the bus subscriber. A numerical IP address for addressing the bus subscribers is allocated using this permanently associated alphanumeric device name. For this purpose, the device name is resolved using a resolution table.

The safe protocol CIP Safety uses a so-called UNID (Unique Network Identifier) for unique addressing. The UNID consists of a Safety Network Number (SNN) and a NodeID. The SNN comprises 6 bytes, and the NodeID comprises 4 bytes. 80 bits therefore need to be set in order to define a complete UNID. It can be easily seen that this would be distinctly impractical using a DIP switch arranged on the bus subscriber 1a, 1b, 1c, . . . , 1n. Therefore, separate software aids together with a programming PC or laptop are usually used for setting purposes. These additional aids must then also be used every time defective devices are replaced, which requires specially trained personnel. This is dispensed with when the method according to the invention is used.

In the exemplary embodiment illustrated in FIG. 1, a central bus control module is provided as a bus subscriber 1a and makes it possible to connect the bus subscribers 1b, 1c, . . . , 1n, which are connected to the central bus control module 1a via the communication medium 2, to a field bus 3. Further modules of the control system such as a central automation control device 32, for example a safety PLC, and further bus subscribers may be connected to the field bus 3. In this case, the automation control device 32 may be connected to the field bus 3 directly or via one or more further bus coupler modules. In this case, the automation control device 32 addresses the bus subscribers 1*a*, 1*b*, . . . , 1*n* using an address which is unique throughout the system. This address is stored as the actual address in the intrinsic address memory 5 of the bus subscribers 1*a*, 1*b*, 1*c*, . . . , 1*n* and/or can be stored by the method according to the invention.

The bus subscribers 1*b*, 1*c*, . . . , 1*n* may be, for example, in the form of failsafe devices of an automation system, for example in the form of input modules, output modules or combined input/output modules. In addition to its bus control function, the central bus control module 1*a* can also have such input and/or output functions.

The bus subscribers 1*a*, 1*b*, 1*c*, . . . , 1*n* each have at least one control processor 4 which, in addition to other tasks, controls data communication and, in particular, the addressing and address recognition of data packets transmitted via the communication medium 2. The control processor 4 may additionally carry out control or input/output functions.

The bus subscribers 1*b*, 1*c*, . . . , 1*n* in the form of input/output modules also have connection terminals 7. Field applications 8*a*, 8*b*, 8*c*, for example sensors and actuators, may be connected to the connection terminals 7 by means of free wiring. The data addressed to a bus subscriber 1*b*, 1*c*, . . . , 1*n* are then converted by the control processor 4 into control signals, for example by extracting data packets, in order to output these control signals to the connection terminals 7 and the actuators connected to the latter. Measurement signals, for example from a sensor 8*b*, may also be forwarded to the control processor 4 via the connection terminals 7 in order to transmit these sensor signals as data via the communication medium 2 to at least one further bus subscriber, in particular to the central bus control module 1*a*. In this case, the central bus control module 1*a* acts as a gateway between the field bus 3 and the internal communication medium 2, that is to say the bus control module 1*a* forwards data packets from the field bus 3 to the communication medium 2 and vice versa.

The bus subscribers 1*a*, 1*b*, 1*c*, . . . , 1*n* may each have an intrinsic address memory 5 which is connected to the control processor 4. The intrinsic address memory 5 stores the bus subscriber's own address which can be used to address the bus subscriber via the communication medium 2 or the field bus 3.

The bus subscribers 1*a*, 1*b*, 1*c*, . . . , 1*n* may also each have, as an index value generating means, a coding switch 6 which is connected to the control processor 4. In one advantageous development, the coding switch 6 is arranged at a location on the respective bus subscriber 1 which is accessible from the outside, for example on the front panel or the rear side of the housing. The user uses or can use the coding switch 6 to set a respective actual index value of the bus subscriber 1.

In the present exemplary embodiment, the central bus control module 1*a* carries out the functions of the device of the first type. The other bus subscribers 1*b*, 1*c*, 1*n* are devices of the second type. The device of the first type, that is to say the bus subscriber 1*a*, therefore additionally has a device association memory 31. The device association memory 31 may be in the form of a fixed memory of the bus subscriber 1*a* or a removable memory, for example an SD memory card. The device association memory 31 is likewise connected to the control processor 4. The device association memory 31 stores, for all bus subscribers 1*b*, 1*c*, . . . , 1*n*, an association between their respective desired addresses and desired index values.

FIG. 1 also shows that a configuration tool 30, for example in the form of a personal computer or laptop with appropriate configuration software, can be connected to the central bus control module 1*a*. The device association memory 31 can be filled with the list of associations between the desired addresses and desired index values of the existing devices of the second type using the configuration tool 30. If the device association memory 31 is in the form of a removable memory, it can also be removed from the central bus control module 1*a* and can be inserted into a corresponding configuration tool in order to be initially filled with data and can then be connected to the central bus control module 1*a* again.

Figure 2:
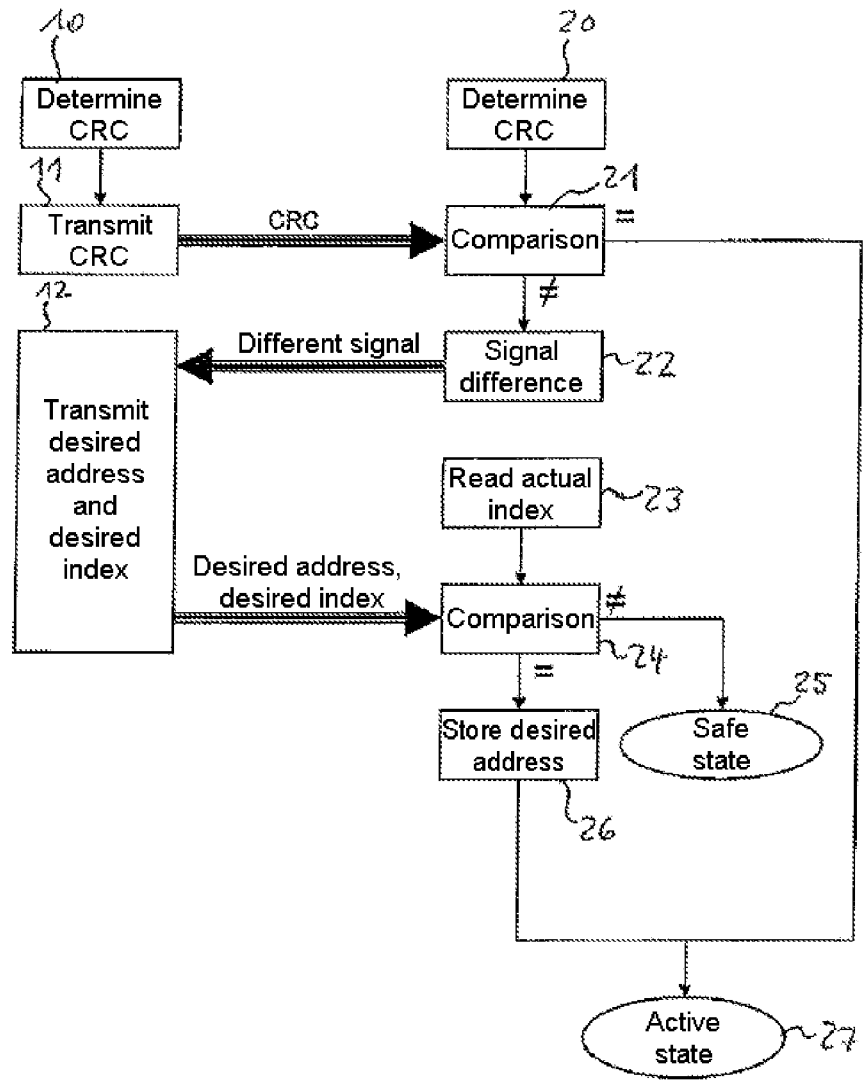
FIGS. 2 and 3 show flowcharts of address association methods.

FIG. 2 shows a first embodiment of a method for storing a desired address in one of the bus subscribers 1*b*, 1*c*, . . . , 1*n*. Steps 10, 11, 12 illustrated on the left in FIG. 2 are carried out in the device of the first type, that is to say in the central bus control module 1*a*. Steps 20 to 27 illustrated on the right in FIG. 2 are carried out in the device of the second type which has been addressed, for example in the bus subscriber 1*b*.

Before the start of the sequence which is automatically carried out by the devices of the first and second types in FIG. 2, a new device of the second type, that is to say a replacement device for the bus subscriber 1*b*, is provided and is prepared for installation in the control system. For this purpose, the index value set in the device to be replaced is read and is set in the replacement device using the index value generating means 6 of the replacement device. The device to be replaced is removed from the control system, the replacement device is then installed in the control system and the control system is switched on again.

When starting the control system, the device of the first type 1*a* first of all carries out step 10. A desired verification code, for example a CRC, is determined. The desired verification code is determined from the desired index value stored in the device association memory 31 for a device of the second type and from the associated desired address. The desired verification code CRC determined is then transmitted to the device of the second type 1*b* via the communication medium 2 in a block 11. An actual verification code, for example in the form of a CRC, was determined in a similar manner in step 20 in the device of the second type. The actual verification code is determined from the actual index value set by the index value generating means 6 and the actual address stored in the intrinsic address memory 5 of the device of the second type according to the same determination method as that used for the desired verification code in step 10 in the device of the first type. A comparison of the two CRCs, that is to say a comparison of the desired verification code and the actual verification code, is then carried out in step 21. If there is a match, the device of the second type is changed, after step 21, to an active state 27 in which it carries out its intended function in the control system.

If step 21 determines that there is a difference between the actual verification code and the received desired verification code, this difference is signaled to the device of the first type in step 22 using a difference signal which is transmitted via the communication medium 2. The device of the first type then carries out a step 12 in which the desired address and the desired index, which was previously used in step 10 to determine the CRC, are transmitted to the device of the second type via the communication medium 2. The actual index value is read by the index value generating means 6 in the device of the second type. In a subsequent step 24, the actual index value and the desired index value transmitted by the device of the first type are compared. If a difference is determined in this case, the device of the second type changes to a safe state 25. In this state, no control functions are carried out.

If the comparison in step 24 reveals a match, the desired address is stored in the intrinsic address memory 5 as the new actual address in a subsequent step 26. The device of the second type then changes to the active state 27.

Figure 3:
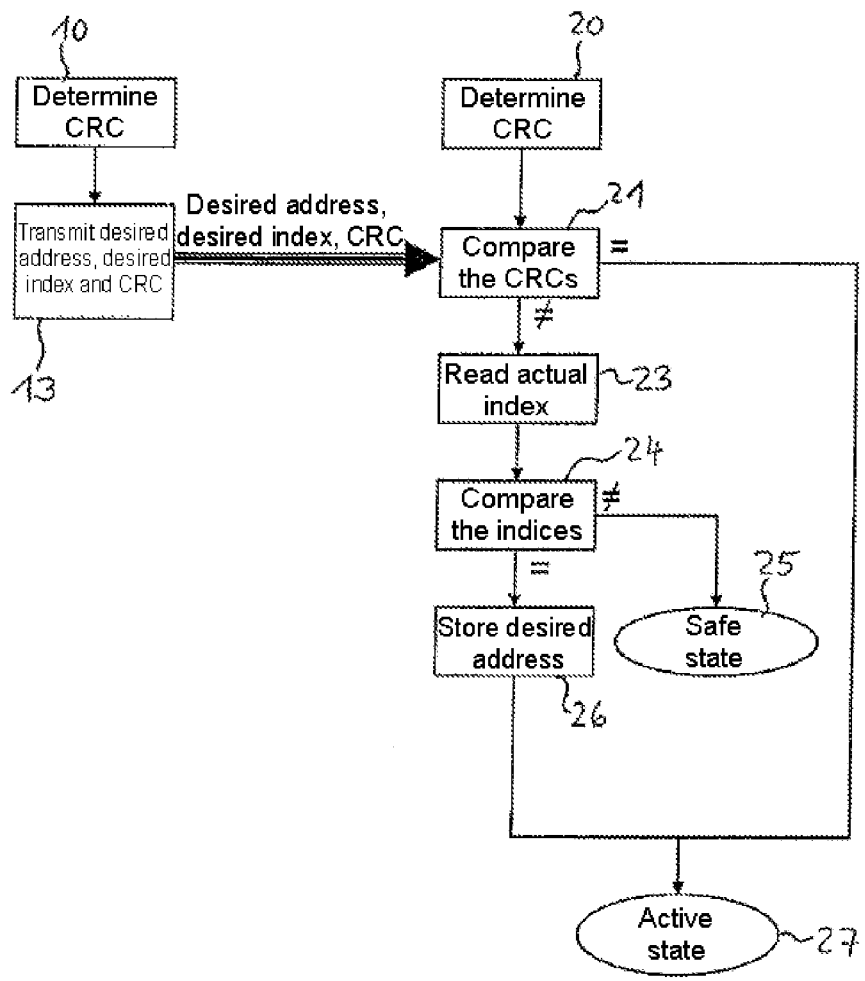

FIG. 3 shows a second embodiment of the method for associating a desired address. In contrast to FIG. 2, the desired address, the desired index and the verification code CRC are transmitted from the device of the first type to the device of the second type via the communication medium 2 in a step 13 which follows step 10. The transmission may be effected in a single data message or in a manner distributed in a plurality of data messages. In contrast to the method according to FIG. 2, however, the complete information needed by the device of the second type to ultimately assess whether the desired address is intended to be stored in the intrinsic address memory is immediately transmitted at the start. This makes it possible to dispense with the additional step of transmitting the difference signal. The functions according to steps 10, 20, 21, 23, 24, 25, 26, 27 correspond to those in the embodiment according to FIG. 2.

If there is a need to replace the device of the first type, that is to say that device which has the central device association memory, there are different advantageous possibilities in order to keep the replacement of this device comparably simple or to at least keep the effort low. A first variant may provide for a superordinate device of the first type, which has the memory contents of device association memories of all existing subordinate devices of the first type of the entire control system or at least of one or more subordinate devices of the first type in a central device association memory, to be present on the field bus 3. When replacing the subordinate device of the first type, the address can then be associated with this device in the same manner as previously described for the devices of the second type. In addition, the information relating to the device association memory can be effected from the central device association memory of the superordinate device of the first type. Complete data recovery can be carried out automatically in this manner without the need for special operating steps or especially trained personnel.

If the device association memory is in the form of a removable memory, it can be easily removed and inserted into a replacement device of the first type when replacing the device of the first type. If the device of the first type is not provided with a removable memory or the removable memory has a defect, the data can be alternatively reassociated in the device association memory using the configuration tool 30, in a similar manner to the initial start-up of the control system 9.

The invention claimed is:

1. Method for storing a desired address in a device of a control system in which at least one device of a first type and one or more devices of a second type are connected to one another via a communication medium for the purpose of interchanging data,
   a) the at least one device of the first type determining a desired verification code, which is valid for a particular device of the second type, at least using a desired address and a desired index value of the particular device of the second type which are stored in a device association memory of the at least one device of the first type,
   b) the at least one device of the first type transmitting the desired verification code to the particular device of the second type,
   c) the particular device of the second type determining an actual verification code at least using an actual address stored in an intrinsic address memory of the particular device of the second type and an actual index value which is set in the particular device of the second type by means of an index value generating means present in said device of said control system,
   d) the particular device of the second type comparing the actual verification code with the desired verification code,
   e) the particular device of the second type storing the desired address associated with the desired verification code as a new actual address in its intrinsic address memory if the actual verification code and the desired verification code differ.

2. Method according to claim 1, wherein the desired address is a unique address of the entire control system.

3. Method according to claim 1, wherein the desired index value is not unique with respect to the entire control system but is unique with respect to a communication segment which is managed by the at least one device of the first type.

4. Method according to claim 1, wherein the desired address comprises a wider range of values than the desired index value.

5. Method according to claim 1, wherein, if the actual verification code and the desired verification code differ, the particular device of the second type informs the at least one device of the first type of the difference.

6. Method according to claim 5, wherein, when the particular device of the second type signals a difference, the at least one device of the first type transmits the desired address associated with the index value of the particular device of the second type in the device association memory of the at least one device of the first type, if appropriate with the desired index value, to the particular device of the second type.

7. Method according to claim 5, wherein the desired verification code is in the form of an error-detecting and/or error-correcting code or has such a code.

8. Method according to claim 1, wherein characterized in that the at least one device of the first type transmits the desired verification code to the particular device of the second type in an address allocation operating mode and in the process associates the particular device of the second type using the desired index value.

9. Computer program with program code means stored on a non-transitory machine-readable storage means, set up to carry out the steps of the method according to claim 1.

10. Control system having the following features:
    a) a device of a first type and a device of a second type, the devices of the first and second types being connected to one another via a communication medium for the purpose of interchanging data,
    b) the device of the first type has a device association memory which stores at least desired addresses of the device of the second type and their associated desired index values,
    c) the device of the first type is set up to carry out the steps of the method according to claim 1 to be carried out by the device of the first type,
    d) the device of the second type has an index value generating means, which can be used to set an index value of the device of the second type in the device of the second type, and an intrinsic address memory for storing its own actual address,
    e) the device of the second type is set up to carry out the steps of the method according to claim 1 to be carried out by the device of the second type.

11. Control system according to claim 10, wherein the device of the first type is in the form of a bus coupler module of a safe control system or in the form of another storage module.

12. Control system according to claim 10, wherein the device of the second type is in the form of a failsafe device of a safe control system.

* * * * *